United States Patent [19]

Hempel

[11] Patent Number: 4,560,178

[45] Date of Patent: Dec. 24, 1985

[54] SEALING SLEEVE WITH A CONNECTING SLEEVE FOR THE LIQUID AND/OR GASTIGHT MOUNTING ON A CONNECTING STUB

[76] Inventor: Jürgen Hempel, Beethovenstrasse 6, 6940 Weinheim, Fed. Rep. of Germany

[21] Appl. No.: 579,819

[22] Filed: Feb. 13, 1984

Related U.S. Application Data

[63] Continuation-in-part of Ser. No. 537,046, Sep. 29, 1983.

[30] Foreign Application Priority Data

Mar. 16, 1983 [DE] Fed. Rep. of Germany ....... 3309386

[51] Int. Cl.$^4$ .................... F16J 15/52; F16D 3/84
[52] U.S. Cl. ................... 277/212 FB; 74/18.2; 464/175
[58] Field of Search .............. 277/212 FB; 74/18.2; 464/175

[56] References Cited

U.S. PATENT DOCUMENTS

| | | | |
|---|---|---|---|
| 4,506,768 | 3/1985 | Innocent | 277/212 FB |
| 4,516,959 | 5/1985 | Krude | 277/212 FB |
| 4,530,506 | 7/1985 | Weiler | 277/212 FB |

Primary Examiner—Robert I. Smith
Attorney, Agent, or Firm—Keil & Weinkauf

[57] ABSTRACT

Sealing sleeve of a polymeric material of low elasticity and with at least one connecting sleeve for the liquid- and/or gastight connection to a connecting stub wherein the connecting sleeve has an inner circumference which is smaller or larger than the outer circumference of the connecting stub, wherein the connecting sleeve has a folding extending substantially non-parallel to the circumferential direction and is thus adaptable to the diameter of the connecting stub.

9 Claims, 7 Drawing Figures

SEALING SLEEVE WITH A CONNECTING SLEEVE FOR THE LIQUID AND/OR GASTIGHT MOUNTING ON A CONNECTING STUB

This application is a continuation-in-part of my application Ser. No. 537,046 filed Sept. 29, 1983.

BACKGROUND OF THE INVENTION AND PRIOR ART

The invention relates to a sealing sleeve of a polymeric material of low elasticity and with at least one connecting sleeve for the liquid-and/or gastight mounting on a connecting stub.

OBJECT AND SUMMARY OF THE INVENTION

Sealing sleeves of the above-mentioned kind conventionally have the form of a bellows terminating at each end in a connecting sleeve. This connecting sleeve is slid, under radial dilation, onto the connecting stub provided therefor and is fixed with the aid of a hose clamp. The radial dilatability results exclusively from the elastic properties of the polymeric material used for the manufacture of the sealing sleeve. This is not very satisfactory.

While polymeric materials with soft-elastic properties, for example rubber, insure particularly simple mounting it is frequently difficult to bring them into the desired shape which gives rise to higher production costs and chemically and mechanically, they are often insufficiently resistant.

The object underlying the invention is to further develop a sealing sleeve of the above-named kind, in such a fashion that not only simple mounting but also great mechanical and chemical stability are insured.

This object is met in a sealing sleeve of the initially named kind, wherein the connecting sleeve has an inner circumference which is larger than the outer circumference of the connecting stub; wherein the connecting sleeve has a folding extending substantially non-parallel to the circumferential direction; and wherein the folding is compressible so as to form at least one continuous sealing surface corresponding to the outer limiting surface of the connecting stub.

The connecting sleeves of the sealing sleeves according to the prior art extend parallel to the outer circumference of the connecting stub. The radial dilation necessary for the assembly therefore presupposes the substantial stretching of the material used for their production.

In the designs proposed according to the invention the connecting sleeve exhibits folds extending more or less parallel to the rotational axis and thus, in absolute terms, a substantially greater length in the circumferential direction. Therefore, contrary to the sealing sleeves according to the prior art, polymeric materials may be used for the proposed designs which compared with rubber necessitate a higher tensile strength to afford the stretching required for the assembly of the sleeve. These are materials with higher mechanical resistivity and hardness, as for example thermoplastic polyeurethane, polyester polymers as well as PVC and polyolefin of high hardness.

The above-named materials can be brought into the desired form, by the dip or the blow process, at low cost and this is of great advantage in order to insure efficient production. Chemical resistivity and sealing performance are considerably better than in the case of rubber, particularly as far as exposure to hydrocarbon containing substances as for example lubricants, is concerned.

The liquid-and/or gastight connection to the connecting stub can be achieved in the case of the proposed designs by precise adaptation of the form of the mutually contacting surfaces. Frequently, however, the sealing obtained in this manner is not yet sufficient and in this case it is recommendable that mutual pressure be exerted, for example by subsequent application of a helical spring and/or a hose clamp.

A particularly low cost possibility for the realization of a liquid and/or gastight connection between the connecting sleeve and the connecting stub exists if the cavities remaining in the intervening space subsequent to the assembly are filled with a permanent-plastic sealing mass. This sealing mass may have adhesive properties and, if desired, may be age-hardening, thereby obviating the subsequent application of secondary holding elements. The folding consists of immediately adjacent recesses, and these reduce the volume of the expansion or compression required for the assembly. The sealing mass contained in the recesses of the folding is statically biased in this fashion, and this insures its reliable penetration into all indentations and pores in the range of the sealing surfaces and thereby insures a good sealing result. Cup-shaped enlarged bulges of the recesses as well as their favorable mutual allocation can also enhance this effect.

BRIEF DESCRIPTION OF THE DRAWINGS

The claimed subject of the invention will be further detailed hereinafter with reference to the accompanying drawings.

There is shown in.

DETAILED DESCRIPTION OF THE PREFERRED EMBODIMENTS

Figure 1:
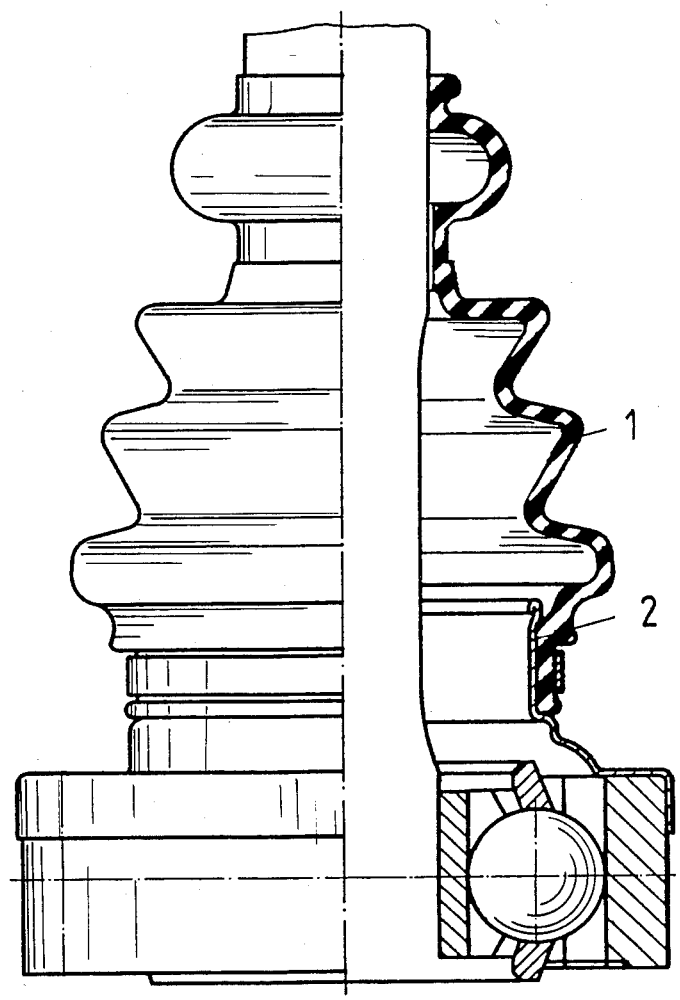
FIG. 1 an assembled sealing sleeve of the proposed kind in partial section.

The sealing sleeve according to FIG. 1 is of axial-symmetrical design. It has a shape similar to that of a bellows which terminates at both ends in connecting sleeves. For the production of the sealing sleeve a thermoplastic polyurethane is used. This material according to DIN No. 53504 has a tensile strength of approximately 30 N/mm$^2$ and a breaking tension of approximately 400%.

The connecting sleeves at both ends are fold-shaped and on their inside they have recesses which, in surface planar fashion, are filled with a reaction adhesive having a polyurethane base. The connecting sleeves, by virtue of the folding can be dilated in the radial direction and be slid onto the associated connecting stub. By virtue of the residual elasticity peculiar to the material there results a good fixation which, with progressive age-hardening of the adhesive sealing mass increasingly gains in strength.

The sealing sleeve as well as the connection to the adjoining machine parts is largely inert, in chemical as well as mechanical respect. A life substantially improved compared with the designs of the prior art is therefore clearly to be expected.

Figure 2:
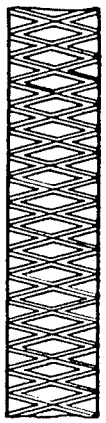
FIGS. 2 to 4 exemplary embodiments of the folding of the connecting sleeve.
Figure 3:
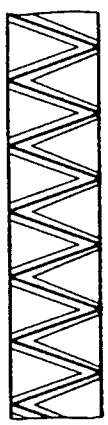
Figure 4:

FIGS. 2 to 4 relate to exemplary embodiments of the folding of a connecting sleeve. This folding is shown in top view and it consists in the embodiment according to FIG. 2 of mutually parallel extending folds which intersect each other. In the embodiment of FIG. 3 the individual folds have a larger mutual spacing and they mutually merge at their ends.

In the embodiment according to FIG. 4 the folds are of sinusoidal form and, related to the circumference they are closed within themselves.

Figure 5:
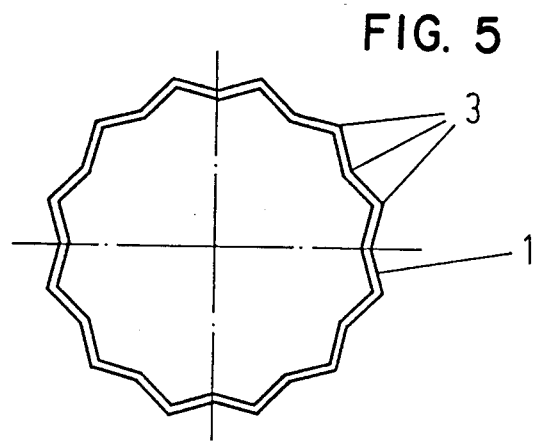
FIGS. 5 to 7 a connecting sleeve before and after assembly.
Figure 6:
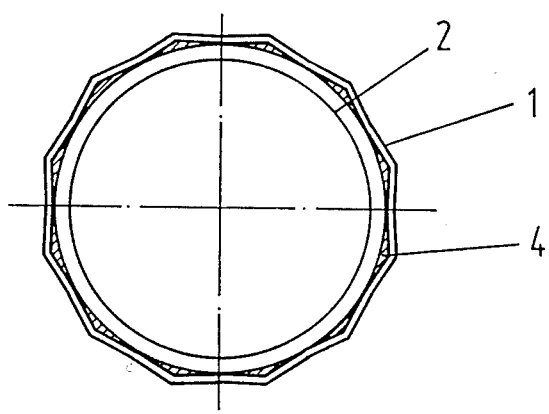

FIG. 5 shows the exemplary embodiment of a connecting sleeve 1 in front view. This sleeve has, uniformly distributed over the circumference, folds which together form a folding pattern 3 and which lend to the connecting sleeve, a good circumferential resilience even if materials of low elasticity are used for the production. In this manner the connecting sleeve can be placed on a connecting stub of an outer diameter exceeding the inner diameter of the sleeve, without a particular expenditure of force. A corresponding arrangement is shown in FIG. 6. The connecting sleeve is designated as 1, the connecting stub as 2, the sealing mass filling the remaining cavities of the folding in the intervening zone, as 4.

Figure 7:
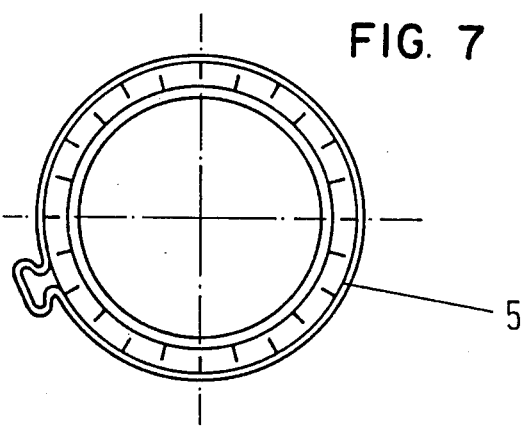

The sealing sleeve shown in FIG. 7, contrary to the just described embodiment, was not stretched in circumferential direction during assembly but instead it was compressed. It is so dimensioned and adapted, as to size, to the connecting stub that a continuously extending sealing surface results between the two parts while the mutually opposing flank faces of the folding contact each other in surface planar fashion. The use of a sealing mass therefore is not necessary either in the range of the sealing surface or in the range of the flank faces. However, it can, for example in the form of a thin film, only positively affect the achieved sealing result. The forces required for achieving a corresponding adaptation of the connecting sleeve are applied by means of a hose clamp 5 of metal. This clamp can also be designed in a releasable fashion and in this case it makes the subsequent removal of the sealing sleeve possible—which is of advantage for example if the lubricant has to be periodically replaced.

I claim:

1. A sealing sleeve/connecting stub combination, said sealing sleeve being of a polymeric material of low elasticity and having at least one connecting sleeve for the liquid and/or gastight connection of said sealing sleeve to said connecting stub, said connecting stub having an outer limiting surface, wherein the connecting sleeve has an inner circumference which is larger than the outer circumference of the connecting stub, wherein the connecting sleeve has a folding extending substantially non-parallel to the circumferential direction, and wherein said folding is compressible so as to form at least one continuous sealing surface corresponding to the outer limiting surface of the connecting stub.

2. A combination as claimed in claim 1, wherein the folding is compressible so as to form an outer surface extending substantially parallel to the sealing surface.

3. A sealing sleeve connecting stub combination, said sealing sleeve being of a polymeric material of low elasticity and having at least one connecting sleeve for the liquid and/or gastight mounting of said sealing sleeve on said connecting stub, wherein the connecting sleeve has an inner perimeter which is smaller than the outer circumference of the connecting stub, and wherein the connecting sleeve has a folding extending substantially non-parallel to the circumferential direction and which upon dilation of its inner diameter permits it to be slid onto the connecting stub.

4. A combination as claimed in claim 1, 2, or 3, wherein the folding is formed by rectilinearly extending folds in the wall of the connecting sleeve.

5. A combination as claimed in claim 1, 2 or 3, wherein the folding is formed by sinusoidal folds in the wall of the connecting sleeve.

6. A combination as claimed in claim 1, 2 or 3, wherein the folding is formed by mutually crossing folds in the wall of the connecting sleeve.

7. A combination as claimed in claim 1 or 3, wherein the folding on the inside has enlarged recesses of cup shape.

8. A combination as claimed in claim 1, 2 or 3, wherein the folding on the inside is filled in surface planar fashion with an adhesive.

9. A combination as claimed in claim 1, 2 or 3, wherein the folding on the inside is filled in surface planar fashion with a permanent plastic sealing mass.

* * * * *